US012479075B2

(12) United States Patent
Spayer et al.

(10) Patent No.: US 12,479,075 B2
(45) Date of Patent: Nov. 25, 2025

(54) POWERED FASTENER DRIVER

(71) Applicant: MILWAUKEE ELECTRIC TOOL CORPORATION, Brookfield, WI (US)

(72) Inventors: Ian Spayer, Berwyn, IL (US); Jonathan E. Abbott, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 17 days.

(21) Appl. No.: 18/422,485

(22) Filed: Jan. 25, 2024

(65) Prior Publication Data

US 2024/0253197 A1 Aug. 1, 2024

Related U.S. Application Data

(60) Provisional application No. 63/481,938, filed on Jan. 27, 2023.

(51) Int. Cl.

| | |
|---|---|
| ***B25C 1/06*** | (2006.01) |
| ***B25C 1/00*** | (2006.01) |
| ***B25C 1/04*** | (2006.01) |
| ***G08B 21/18*** | (2006.01) |

(52) U.S. Cl.

CPC ................ *B25C 1/06* (2013.01); *B25C 1/008* (2013.01); *B25C 1/047* (2013.01); *G08B 21/182* (2013.01)

(58) Field of Classification Search

CPC ........... B25C 1/06; B25C 1/008; B25C 1/047; G08B 21/182

See application file for complete search history.

(56) References Cited

U.S. PATENT DOCUMENTS

| | | | |
|---|---|---|---|
| 4,679,719 | A | 7/1987 | Kramer |
| 5,794,831 | A | 8/1998 | Velan et al. |
| 5,911,350 | A | 6/1999 | Bolger et al. |
| 6,679,410 | B2 | 1/2004 | Würsch et al. |

(Continued)

FOREIGN PATENT DOCUMENTS

| | | | |
|---|---|---|---|
| CN | 201300400 | Y | 9/2009 |
| CN | 205166854 | U | 4/2016 |

(Continued)

*Primary Examiner* — Michelle Lopez

(74) *Attorney, Agent, or Firm* — Michael Best & Friedrich LLP

(57) ABSTRACT

A powered fastener driver includes a cylinder containing a pressurized gas, a piston within the cylinder and moveable from a top-dead-center position to a bottom-dead-center position, a driver blade moveably coupled to the piston for driving a fastener into a workpiece, and a lifter mechanism for providing torque to move the driver blade from the bottom-dead-center position toward the top-dead-center position. The powered fastener driver also includes a sensor configured to monitor a current draw of a motor of the lifter mechanism, and a controller is electrically connected to the motor and the sensor. The controller is configured to monitor the current draw of the motor, correlate, using an algorithm stored in the controller, the current draw to a pressure value. The controller is also configured to compare the pressure value to a predetermined pressure range and activate an indicator when the pressure value is outside the predetermined pressure range.

20 Claims, 5 Drawing Sheets

(56) References Cited

U.S. PATENT DOCUMENTS

| | | | |
|---|---|---|---|
| 6,776,320 | B2 | 8/2004 | Sprenger et al. |
| 6,783,045 | B2 | 8/2004 | Shima et al. |
| 6,796,476 | B2 | 9/2004 | Birk et al. |
| 6,796,477 | B2 | 9/2004 | Chen |
| 6,938,811 | B2 | 9/2005 | Ehmig et al. |
| 6,971,568 | B2 | 12/2005 | Schiestl et al. |
| 6,983,871 | B2 | 1/2006 | Shima et al. |
| 6,986,450 | B2 | 1/2006 | Matthews et al. |
| 7,004,366 | B2 | 2/2006 | Schiestl et al. |
| 7,021,251 | B2 | 4/2006 | Ohmori et al. |
| 7,048,164 | B2 | 5/2006 | Favre-Bulle et al. |
| 7,108,164 | B2 | 9/2006 | Shima et al. |
| 7,131,564 | B2 | 11/2006 | Matthews et al. |
| 7,134,586 | B2 | 11/2006 | McGee et al. |
| 7,137,541 | B2 | 11/2006 | Baskar et al. |
| 7,145,329 | B2 | 12/2006 | Favre-Bulle |
| 7,194,988 | B2 | 3/2007 | Ohmori et al. |
| 7,275,505 | B2 | 10/2007 | Moeller et al. |
| 7,285,877 | B2 | 10/2007 | Gorti et al. |
| 7,299,963 | B2 | 11/2007 | Moeller et al. |
| 7,331,098 | B2 | 2/2008 | Matthews et al. |
| 7,427,007 | B2 | 9/2008 | Shima et al. |
| 7,444,963 | B2 | 11/2008 | Tanaka |
| 7,748,097 | B1 | 7/2010 | Matthews et al. |
| 7,793,811 | B1 | 9/2010 | Pedicini et al. |
| 7,854,360 | B2 | 12/2010 | Suda |
| 7,905,377 | B2 | 3/2011 | Krondorfer et al. |
| 7,934,565 | B2 | 5/2011 | Krondorfer et al. |
| 8,011,441 | B2 | 9/2011 | Leimbach et al. |
| 8,011,547 | B2 | 9/2011 | Leimbach et al. |
| 8,167,182 | B2 | 5/2012 | Shima et al. |
| 8,215,528 | B2 | 7/2012 | Matsunaga et al. |
| 8,230,941 | B2 | 7/2012 | Leimbach et al. |
| 8,267,296 | B2 | 9/2012 | Leimbach et al. |
| 8,267,297 | B2 | 9/2012 | Leimbach et al. |
| 8,286,722 | B2 | 10/2012 | Leimbach et al. |
| 8,336,749 | B2 | 12/2012 | Largo |
| 8,347,978 | B2 | 1/2013 | Forster et al. |
| RE44,001 | E | 2/2013 | Pedicini et al. |
| 8,387,718 | B2 | 3/2013 | Leimbach et al. |
| 8,408,327 | B2 | 4/2013 | Forster et al. |
| 8,412,179 | B2 | 4/2013 | Gerold et al. |
| 8,434,566 | B2 | 5/2013 | Forster et al. |
| 8,464,921 | B2 | 6/2013 | Shima et al. |
| 8,523,035 | B2 | 9/2013 | Pedicini et al. |
| 8,602,282 | B2 | 12/2013 | Leimbach et al. |
| 8,622,271 | B2 | 1/2014 | Shima et al. |
| 8,733,610 | B2 | 5/2014 | Pedicini |
| 8,763,874 | B2 | 7/2014 | McCardle et al. |
| 8,939,341 | B2 | 1/2015 | Pedicini et al. |
| 9,321,162 | B2 | 4/2016 | Adachi et al. |
| 9,381,633 | B2 | 7/2016 | Moore et al. |
| 9,381,635 | B2 | 7/2016 | Moore et al. |
| 9,469,021 | B2 | 10/2016 | Gregory et al. |
| 9,486,904 | B2 | 11/2016 | Gregory et al. |
| 9,498,871 | B2 | 11/2016 | Gregory et al. |
| 9,533,408 | B2 | 1/2017 | Forster et al. |
| 9,550,288 | B2 | 1/2017 | Moore et al. |
| 9,555,530 | B2 | 1/2017 | Pedicini et al. |
| 9,604,352 | B2 | 3/2017 | Kobayashi et al. |
| 9,643,305 | B2 | 5/2017 | Gregory et al. |
| 9,649,755 | B2 | 5/2017 | Gregory et al. |
| 9,662,777 | B2 | 5/2017 | Pomeroy et al. |
| 9,664,387 | B2 | 5/2017 | Gerold et al. |
| 9,676,088 | B2 | 6/2017 | Leimbach et al. |
| 9,731,408 | B2 | 8/2017 | Groer et al. |
| 9,782,880 | B2 | 10/2017 | Moore et al. |
| 9,827,658 | B2 | 11/2017 | Gregory et al. |
| 9,873,189 | B2 | 1/2018 | Gerold et al. |
| 9,937,608 | B2 | 4/2018 | Hahn et al. |
| 10,160,108 | B2 | 12/2018 | Beck |
| 10,213,911 | B2 | 2/2019 | Moore et al. |
| 10,335,937 | B2 | 7/2019 | Moore et al. |
| 10,414,033 | B2 | 9/2019 | Ekstrom et al. |
| 10,456,897 | B2 | 10/2019 | Grandjean et al. |
| 10,478,954 | B2 | 11/2019 | Leimbach et al. |
| 10,654,154 | B2 | 5/2020 | Schnell et al. |
| 10,710,227 | B2 | 7/2020 | Pomeroy et al. |
| 10,717,178 | B2 | 7/2020 | Yamamoto et al. |
| 10,723,005 | B2 | 7/2020 | Meyer et al. |
| 10,759,029 | B2 | 9/2020 | Schnell et al. |
| 10,786,891 | B2 | 9/2020 | Noguchi et al. |
| 10,821,585 | B2 | 11/2020 | Kabbes et al. |
| 10,850,377 | B2 | 12/2020 | Steurer |
| 10,888,981 | B2 | 1/2021 | Gregory et al. |
| 10,898,996 | B2 | 1/2021 | Heeb et al. |
| 10,898,997 | B2 | 1/2021 | Yamamoto et al. |
| 10,926,387 | B2 | 2/2021 | Moore et al. |
| 10,926,390 | B2 | 2/2021 | Dittrich et al. |
| 10,940,579 | B2 | 3/2021 | Watanabe et al. |
| 10,967,491 | B2 | 4/2021 | Yasutomi et al. |
| 10,987,790 | B2 | 4/2021 | Garber |
| 11,007,629 | B2 | 5/2021 | Yamamoto et al. |
| 11,034,006 | B2 | 6/2021 | Wierzchon |
| 11,034,007 | B2 | 6/2021 | Leimbach et al. |
| 11,103,987 | B2 | 8/2021 | Dittrich et al. |
| 11,179,836 | B2 | 11/2021 | Gregory et al. |
| 11,221,611 | B2 | 1/2022 | Abbott et al. |
| 11,229,995 | B2 | 1/2022 | Gregory et al. |
| 11,241,776 | B2 | 2/2022 | Leimbach et al. |
| 11,247,320 | B2 | 2/2022 | Li et al. |
| 11,279,014 | B2 | 3/2022 | Yamamoto et al. |
| 11,338,422 | B2 | 5/2022 | Yamamoto et al. |
| 11,376,722 | B2 | 7/2022 | Kondou et al. |
| 11,396,095 | B2 | 7/2022 | Moore et al. |
| 12,090,592 | B2 | 9/2024 | Bloomfield et al. |
| 12,122,028 | B2 | 10/2024 | Miller et al. |
| 2007/0108250 | A1 | 5/2007 | Odoni et al. |
| 2011/0067895 | A1 | 3/2011 | Nobe et al. |
| 2011/0303428 | A1 | 12/2011 | Roth et al. |
| 2011/0303728 | A1 | 12/2011 | Franz et al. |
| 2011/0303733 | A1 | 12/2011 | Fielitz et al. |
| 2013/0320063 | A1 | 12/2013 | Gregory et al. |
| 2014/0001224 | A1 | 1/2014 | McNeill et al. |
| 2014/0263535 | A1 | 9/2014 | Rajani et al. |
| 2015/0136829 | A1 | 5/2015 | Howes |
| 2015/0283690 | A1 | 10/2015 | Welte et al. |
| 2016/0271748 | A1 | 9/2016 | Gerold et al. |
| 2018/0126530 | A1* | 5/2018 | Pomeroy ................. B25C 1/047 |
| 2019/0224831 | A1 | 7/2019 | Yamamoto et al. |
| 2019/0224832 | A1 | 7/2019 | Watanabe et al. |
| 2019/0224833 | A1 | 7/2019 | Watanabe et al. |
| 2019/0375084 | A1 | 12/2019 | Bierdeman et al. |
| 2020/0078897 | A1 | 3/2020 | Ypma |
| 2020/0114500 | A1 | 4/2020 | Bierdeman et al. |
| 2020/0130156 | A1 | 4/2020 | Takeuchi et al. |
| 2020/0346333 | A1 | 11/2020 | Po et al. |
| 2020/0391364 | A1 | 12/2020 | Yasutomi et al. |
| 2021/0008701 | A1 | 1/2021 | Tan et al. |
| 2021/0016424 | A1 | 1/2021 | Kabbes et al. |
| 2021/0023686 | A1 | 1/2021 | Tan et al. |
| 2021/0107125 | A1 | 4/2021 | Gregory et al. |
| 2021/0154816 | A1 | 5/2021 | Moore et al. |
| 2021/0154818 | A1 | 5/2021 | Watanabe et al. |
| 2021/0213595 | A1 | 7/2021 | Yasutomi et al. |
| 2021/0229251 | A1 | 7/2021 | Dittrich et al. |
| 2021/0347023 | A1 | 11/2021 | Carrier et al. |
| 2022/0080571 | A1 | 3/2022 | Gregory et al. |
| 2022/0105614 | A1 | 4/2022 | Robinson et al. |

FOREIGN PATENT DOCUMENTS

| | | | |
|---|---|---|---|
| CN | 108145658 | A | 6/2018 |
| CN | 110434808 | A | 11/2019 |
| CN | 210909849 | U | 7/2020 |
| DE | 9200961 | U1 | 4/1992 |
| DE | 102006053149 | A1 | 5/2008 |
| EP | 2383085 | A1 | 11/2011 |
| EP | 2883664 | A1 | 6/2015 |
| WO | 2021001196 | A1 | 1/2021 |
| WO | 2021242305 | A1 | 12/2021 |

* cited by examiner

POWERED FASTENER DRIVER

CROSS-REFERENCE TO RELATED APPLICATIONS

This application claims priority to U.S. Provisional Patent Application No. 63/481,938 filed on Jan. 27, 2023, the entire content of which is incorporated herein by reference.

FIELD OF THE INVENTION

The present disclosure relates to power tools, and more specifically to powered fastener drivers.

BACKGROUND OF THE INVENTION

There are various fastener drivers used to drive fasteners (e.g., nails, tacks, staples, etc.) into a workpiece know in the art. These fastener drivers operate utilizing various means (e.g., compressed air generated by an air compressor, gas spring, or the like) know in the art. Over the lifetime of the fastener driver, components of the tool may wear, which can cause the driver to fail.

SUMMARY OF THE INVENTION

In one aspect, the present invention includes a powered fastener driver including a housing, a cylinder within the housing and containing a pressurized gas, a piston within the cylinder and moveable from a top-dead-center position to a bottom-dead-center position, a driver blade moveably coupled to the piston for driving a fastener into a workpiece, and a lifter mechanism for providing torque to move the driver blade from the bottom-dead-center position toward the top-dead-center position. The lifter mechanism includes a motor. The powered fastener driver also includes a sensor configured to monitor a current draw of the motor and a controller electrically connected to the motor and the sensor. The controller is configured to monitor the current draw of the motor and correlate, using an algorithm stored in the controller, the current draw to a pressure value. The controller is also configured to compare the pressure value to a predetermined pressure range and activate an indicator when the pressure value is outside the predetermined pressure range.

In another aspect, the present invention includes a powered fastener driver including a housing, a cylinder within the housing and containing a pressurized gas, a piston within the cylinder and moveable from a top-dead-center position to a bottom-dead-center position, a driver blade moveably coupled to the piston for driving a fastener into a workpiece, and a lifter mechanism for providing torque to move the driver blade from the bottom-dead-center position toward the top-dead-center position. The lifter mechanism includes a motor. The powered fastener driver also includes an optical sensor configured to monitor a position of the driver blade and a controller electrically connected to the motor and the optical sensor. The controller is configured to monitor the position of the driver blade and correlate, using an algorithm stored in the controller, the position of the driver blade to an acceleration value of the driver blade. The controller is also configured to correlate, using an algorithm stored in the controller, the acceleration value of the driver blade to a pressure value of the cylinder, compare the pressure value to a predetermined pressure range, and activate an indicator when the pressure value outside the predetermined pressure range.

In another aspect, the present invention includes a powered fastener driver including a housing, a cylinder within the housing, the cylinder containing a pressurized gas, a piston within the cylinder and moveable from a top-dead-center position to a bottom-dead-center position, a driver blade moveably coupled to the piston for driving a fastener into a workpiece, and a lifter mechanism for providing torque to move the driver blade from the bottom-dead-center position toward the top-dead-center position. The lifter mechanism includes a motor. The power fastener driver also includes a current sensor configured to monitor a current draw of the motor, an optical sensor configured to monitor a position of the driver blade, and a controller electrically connected to the motor, the current sensor, and the optical sensor. The controller is configured to monitor the current draw of the motor using the current sensor and the position of the driver blade using the optical sensor. The controller is also configured to correlate, using a first algorithm stored in the controller, the current draw to a first pressure value, and correlate, using a second algorithm stored in the controller, the position of the driver blade to an acceleration value of the driver blade and the acceleration value to a second pressure value of the cylinder. The controller is also configured to compare the first pressure value and the second pressure value to a predetermined pressure range, and activate an indicator when the first pressure value or the second pressure value is outside the predetermined pressure range.

In another aspect, the present invention includes a powered fastener driver including a housing, a cylinder within the housing and containing a pressurized gas, a bumper positioned within the cylinder, and a piston within the cylinder and moveable from a top-dead-center position to a bottom-dead-center position. The piston configured to engage the bumper when the piston moves to the bottom-dead-center position. The powered fastener driver also includes a driver blade moveably coupled to the piston for driving a fastener into a workpiece, a lifter mechanism for providing torque to move the driver blade from the bottom-dead-center position toward the top-dead-center position, a sensor configured to monitor a characteristic of the powered fastener driver, and a controller electrically connected to the lifter mechanism and the sensor. The controller is configured to monitor the characteristic of the powered fastener driver, correlate, using an algorithm stored in the controller, the characteristic of the powered fastener driver to a bumper wear value. The controller is also configured to compare the bumper wear value to a predetermined bumper wear threshold range, and activate an indicator when the bumper wear value is outside of the predetermined bumper wear threshold range.

In another aspect, the present invention includes a powered fastener driver including a housing, a cylinder within the housing, the cylinder containing a pressurized gas, a piston within the cylinder and moveable from a top-dead-center position to a bottom-dead-center position, and a driver blade moveably coupled to the piston for driving a fastener into a workpiece. The driver blade having a tooth. The powered fastener driver also includes a lifter mechanism configured to engage the tooth of the driver blade to provide torque to move the driver blade from the bottom-dead-center position toward the top-dead-center position, a sensor configured to monitor a characteristic of the powered fastener driver, and a controller electrically connected to the lifter mechanism and the sensor. The controller is configured to monitor the characteristic of the powered fastener driver, correlate, using an algorithm stored in the controller, the characteristic of the powered fastener driver to a driver blade tooth wear value. The controller is also configured to compare the driver blade tooth wear value to a predetermined driver blade tooth wear threshold range and activate an indicator when the driver blade tooth wear value outside of the predetermined driver blade tooth wear threshold range.

Features and aspects of the disclosure will become apparent by consideration of the following detailed description and accompanying drawings.

Figure 1:
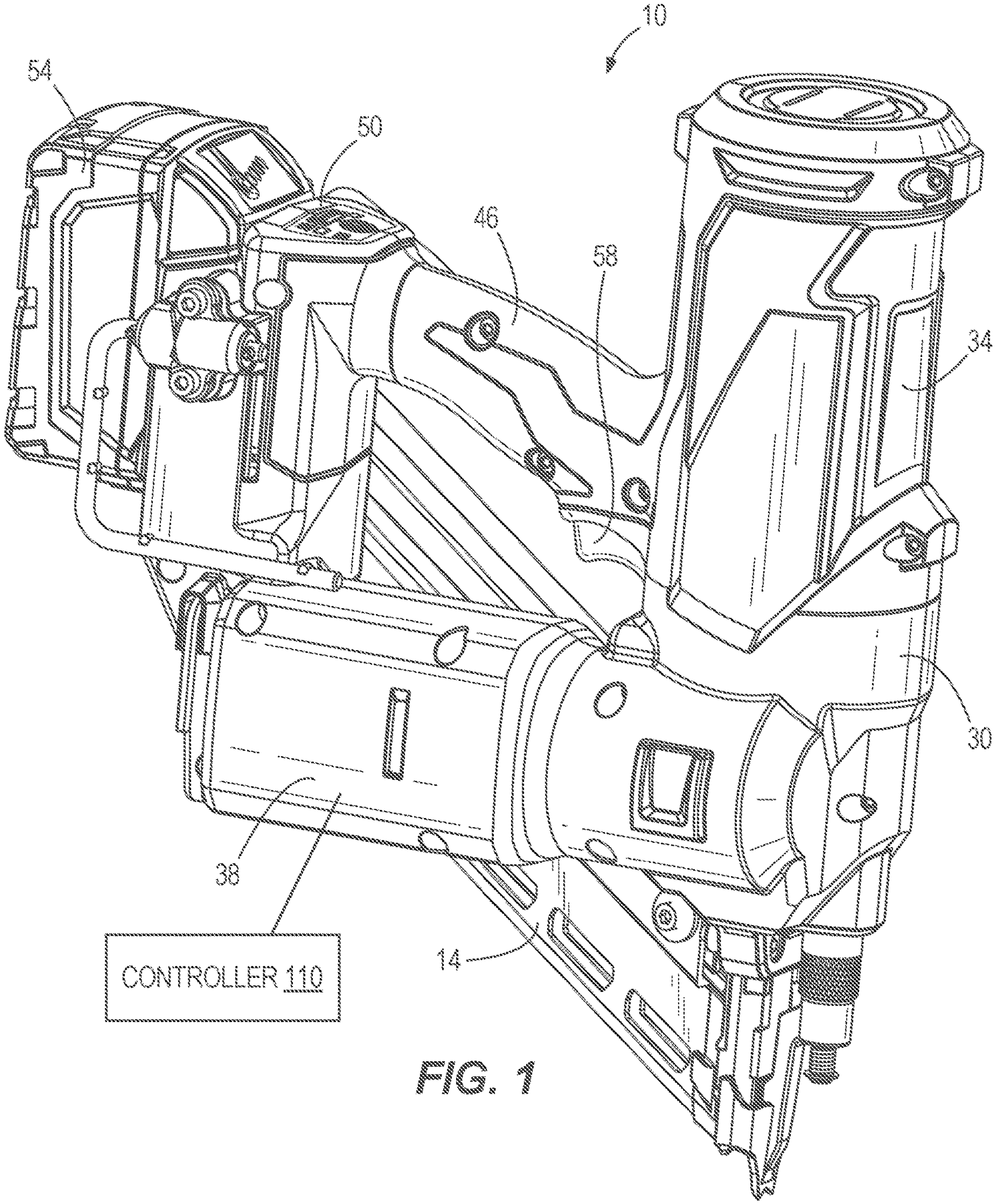
FIG. 1 is perspective view of a powered fastener driver.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 2:
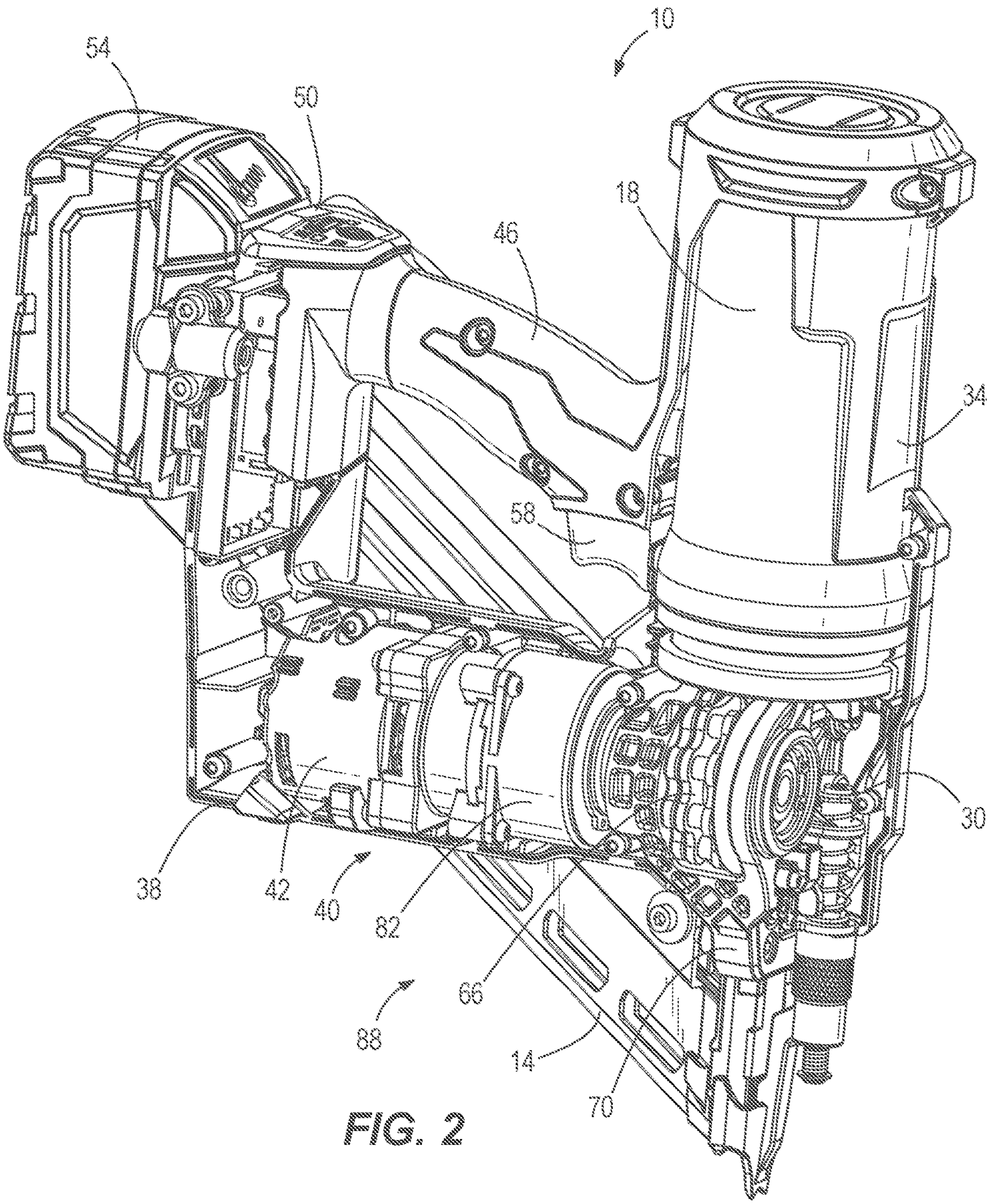
FIG. 2 is another perspective view of the powered fastener driver of FIG. 1, with portions of a housing removed.
Figure 3:
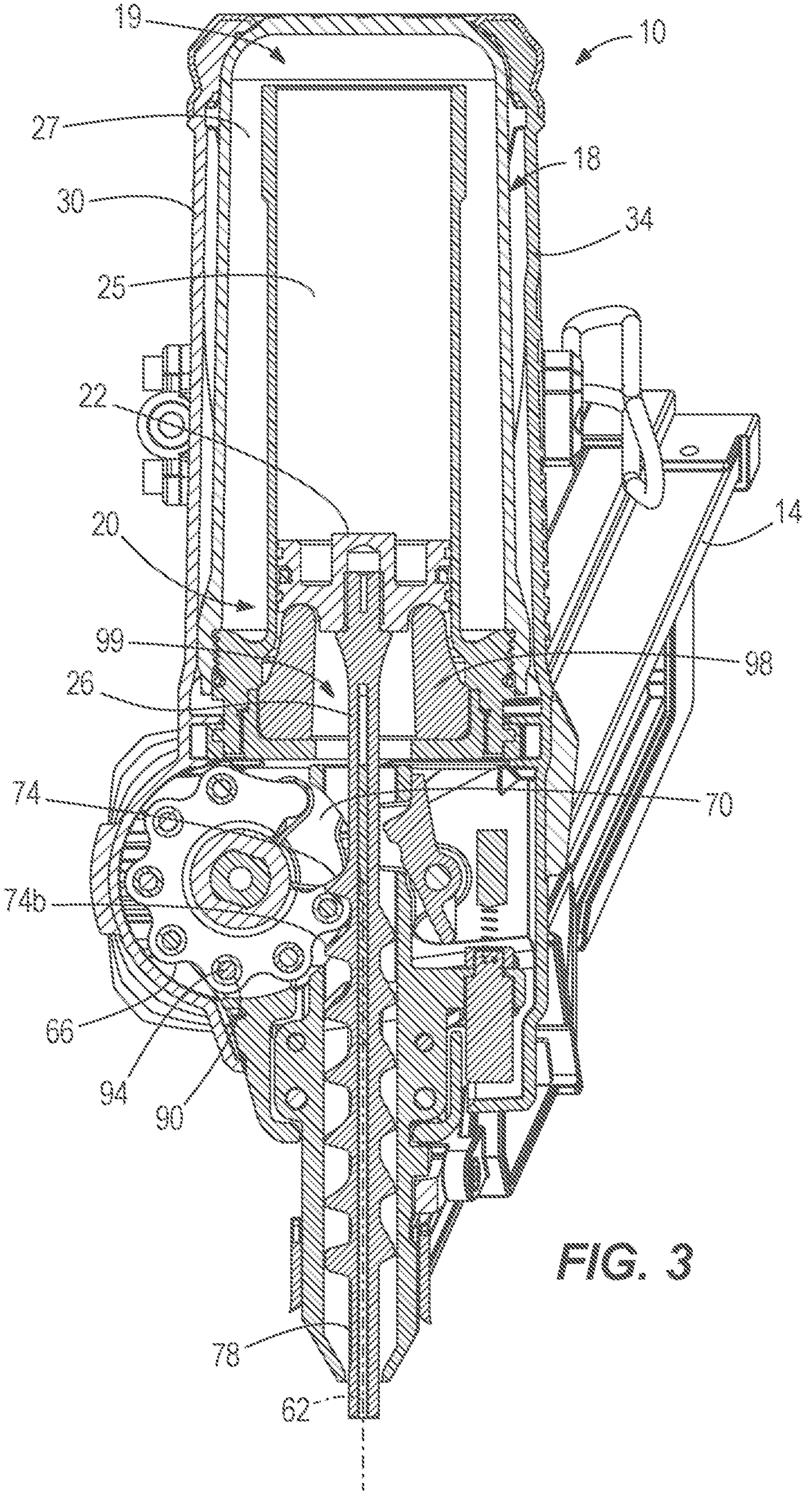
FIG. 3 is a partial cross-sectional view of the gas spring-powered fastener driver

With reference to FIGS. 1-3, a gas spring-powered fastener driver 10 is operable to drive fasteners (e.g., nails, tacks, staples, etc.) held within a magazine 14 into a workpiece. The fastener driver 10 includes a cylinder 18 containing a pressurized gas. A piston 22 is supported within the cylinder 18 and is moveable from a top-dead-center position to a bottom-dead-center position. The cylinder 18 includes a drive cylinder 25 (FIG. 3) having an open end in fluid communication with a storage chamber cylinder 27, which exposes the piston 22 positioned within the drive cylinder 25 to the pressurized gas in the storage chamber 27. The fastener driver 10 further includes a driver blade 26 that is attached to the piston 22 and moveable therewith.

The fastener driver 10 includes a housing 30 having a cylinder housing portion 34 and a motor housing portion 38 extending therefrom. The cylinder housing portion 34 is configured to support the cylinder 18, whereas the motor housing portion 38 is configured to support a drive unit 40. The drive unit 40 includes an electric motor 42 and a transmission 82 positioned downstream of the motor 42. In addition, the illustrated housing 30 includes a handle portion 46 extending from the cylinder housing portion 34, and a battery attachment portion 50 coupled to an opposite end of the handle portion 46. A battery pack 54 is removably coupled to the battery attachment portion 50 and supplies electrical power to the drive unit 40. The handle portion 46 supports a trigger 58, which is depressed by a user to initiate a driving cycle of the fastener driver 10.

With reference to FIG. 3, the driver blade 26 defines a driving axis 62 and includes a plurality of driver blade teeth or lift teeth 74 formed along an edge 78 of the driver blade 26, which extends in the direction of the driving axis 62. In particular, the lift teeth 74 project laterally from the edge 78 relative to the driving axis 62. During a driving cycle, the driver blade 26 and piston 22 are moveable along the driving axis 62 between a top-dead-center (TDC) position and a bottom-dead-center (BDC) or driven position. The piston 22 is adjacent a top end (FIG. 3) 19 of the cylinder 18 in the TDC position, and the piston 22 is adjacent a bottom end 20 (FIG. 3) of the cylinder 18 in the BDC position. The fastener driver 10 further includes a rotary lifter 66 supported within the housing 30 by a frame 70 (FIG. 2). The rotary lifter 66 includes a plurality of rollers 90 supported by a plurality of pins 94. The lifter 66 receives torque from the drive unit 40, causing the lifter 66 to rotate. The lifter 66 and the drive unit 40 may be collectively referred to as a lifter assembly 88 (FIG. 2). As the lifter 66 rotates, the rollers 90 sequentially engage the lift teeth 74 formed on the driver blade 26 to return the driver blade 26 along the driving axis 62 from the BDC position toward the TCD position. The rotary lifter 66 and the drive unit 40 defines a lifter mechanism 88 for providing torque to move the driver blade 26 from the bottom-dead-center position toward the top-dead-center position.

The cylinder 18 includes a bumper 98 located at the bottom end 20 of the cylinder 18. The bumper 98 has a generally annular, frusto-conical shape with a central bore 99 therethrough. The bore 99 is coaxial with the driving axis 62 such that the driver blade 26 extends through the bore 99. As the piston 22 and the driver blade 26 move from the TDC position toward the BDC position, the piston 22 impacts the bumper 98, which absorbs the impact from the piston 22 and stops the piston 22 in the BDC position. In some embodiments, the bumper 98 is constructed of a resilient material (e.g., rubber, elastomeric material, or the like.

Throughout the life of the fastener driver 10, maintenance or servicing may be required on specific components. The components may be prone to leakage or wear due to extreme conditions (e.g., cold or hot temperatures), misuse (e.g., dry firing), or prolonged usage. As such, knowing the conditions of the components can be important to determine when maintenance is required to prevent a premature failure of the fastener driver 10. Thus, predictive maintenance techniques are implemented in the fastener driver 10 to alert the operator when preventative maintenance is required to maintain the fastener driver 10 in proper working condition.

Figure 4:
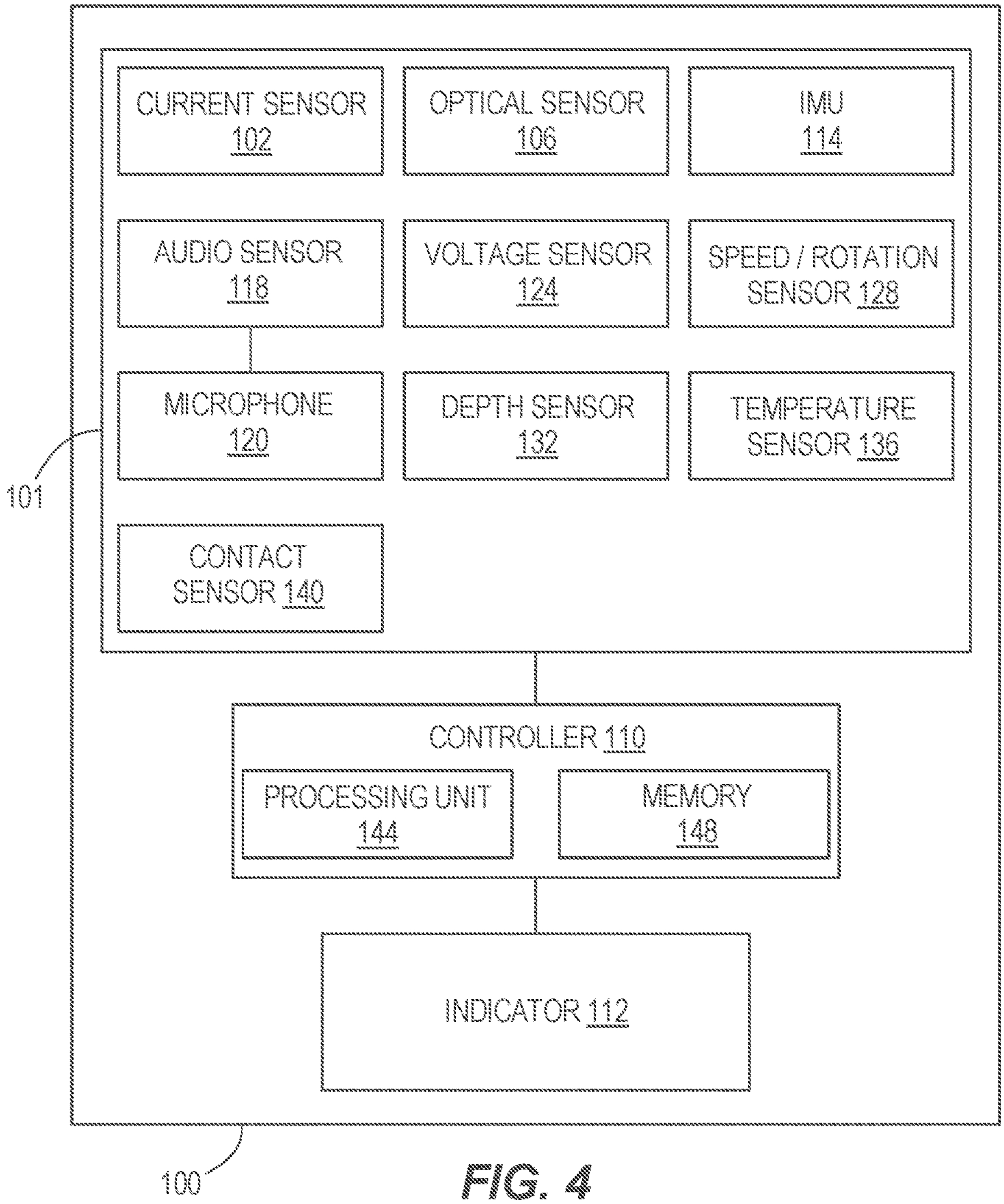
FIG. 4 is a schematic view of a control system of the powered fastener driver of FIG. 1.

With reference to FIG. 4, a preventive maintenance system 100 for the powered fastener driver 10 is illustrated. The preventive maintenance system 100 includes a controller 110, a plurality of sensors 101 in communication with the controller 110, and an indicator 112 in communication with the controller 110. In the illustrated embodiment, the sensors 101 include a current sensor 102, an optical sensor 106, an inertial measurement unit (IMU) 114, an audio sensor 118 having a microphone 120, a voltage sensor 124, a speed or rotation sensor 128, a depth sensor 132, a temperature sensor 136, and a contact sensor 140. It should be appreciated that while the system 100 illustrates a single sensor for each type of sensor 102, 106, 114, 118, 120, 124, 128, 132, 136, 140, the system 100 may alternatively include one or more of each type of sensor 102, 106, 114, 118, 120, 124, 128, 132, 136, 140.

The controller 110 may include, among other things, a processing unit 144 (e.g., a microprocessor, a microcontroller, or another suitable programmable device) and a memory 148 (e.g., a direct memory access (DMA)). The memory 148 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The memory 148 is capable of storing an array of data described in detail below. The processing unit 144 is connected to the memory 148 and executes software instructions that are capable of being stored in a RAM of the memory 148 (e.g., during execution), a ROM of the memory 148 (e.g., on a generally permanent basis), or another non-transitory computer readable medium such as another memory or a disc. Software included in the implementation of the fastener driver 10 can be stored in the memory 148 of the controller 110. The software includes, for example, an interrupt service routine (ISR), firmware, one or more applications, program data, filters, rules, one or more program modules, and other executable instructions. The controller 110 is configured to retrieve from the memory 148 and execute, among other things, instructions related to the control processes and methods described herein. In other constructions, the controller 110 includes additional, fewer, or different components.

In addition, the plurality of sensors 101 may be supported within the housing 30 of the powered fastener driver 10 in various positions to detect a desired characteristic of the fastener driver 10. The indicator 112 is also exposed from an exterior of the housing 30 and may be configured as one or more of lights (e.g., a light-emitting diode or LED), a display panel, or the like. The controller 110 may selectively activate the indicator 112 to alert the operator that maintenance is required. In other embodiments, indicator 112 may display a value to the user that indicates an amount of time, cycles, or the like remaining before preventive maintenance is required. In other embodiments, the indicator 112 may display one or levels of severity service required for the driver 10 (e.g., service check, maintenance required, failure of the driver, or the like). In such embodiments the indicator 112 may visually show one or more levels of severity service required via visual patterns. For examples, the LEDs may blink in a pattern and then shutoff, may remain on, or continuously blink.

In some embodiments, the system 100 is configured to calculate (for example, by an algorithm in the controller 110) an abnormal pressure value in the cylinder 18, abnormal wear to the teeth 74 of the driver blade 26, and abnormal wear to the bumper 98. While these three scenarios are described in detail below, it should be appreciated that the sensors 101 may be used to detect whether other components of the fastener driver 10 are prematurely worn and require maintenance.

The fastener driver 10 does not require an external source of air pressure for operation, but rather includes pressurized gas in the cylinder 18. The pressure within the cylinder 18 is critical for operation of the fastener driver 10. For example, if the pressure is too low, the fastener driver 10 may not generate enough force to drive the fasteners flush into a workpiece. Additionally, if the pressure is too high, the motor 42 will have to work harder to return the piston 22 and the driver blade 26 from the BDC position toward the TDC position. This may increase the stress experienced by one or more of the individual components of the motor 42, which may reduce the useful life of the motor 42. As such, in some embodiments of the fastener driver 10, the controller 110 is programmed to maintain a predetermined pressure range for the cylinder 18 for optimal performance of the fastener driver 10.

The predetermined pressure range is defined by a predetermined low-pressure value and a predetermined high-pressure value. In some embodiments of the fastener driver 10, the predetermined low-pressure value is between 82 and 92 pounds per square inch ("PSI") and the predetermined high-pressure value is between 105 PSI and 115 PSI. The temperature of the gas in the cylinder 18 affects the pressure of the cylinder 18 and thus the performance of the driver 10 and wear of the bumper 98.

In some embodiments, the driver 10 may compensate or change the predetermined low-pressure value based on the temperature of the cylinder 18 (e.g., whether calculated by the temperature sensor 136 or estimated based on other sensors 101). In other words, the driver 10 may include a pressure value that is less than the predetermined low-pressure value when the driver 10 is below an expected ambient operating temperature (e.g., stored in a cold environment). For example, the controller 110 may compare the temperature of the cylinder 18 to the expected ambient operating temperature. If the cylinder 18 is below the expected ambient operating temperature, the controller 110 will disable the control scheme described below until the temperature of the cylinder 18 reaches the ambient operating temperature (e.g., the driver 10 warms up). Disabling the control scheme when the temperature is below the ambient operating temperature prevents activation of the indicator 112 when maintenance to the driver 10 is not required.

In some embodiments, the expected ambient operating temperature may be estimated based on location and time information of the driver 10. The location information may be determined by a GPS module on the driver 10, a cellular, short range wireless technology, and/or other Internet or Things (IOT) connections. The time information may be determined by a real-time clock, the GPS Module, or IOT connection. The location and time information may be combined to determine the ambient operating temperature to allow the controller 110 to determine if predictive maintenance is required. In some embodiments, the controller 110 may store the temperature information in a memory for improved predictive maintenance.

A sensor (e.g., the current sensor 102, the optical sensor 106, the voltage sensor 124, and/or the temperature sensor 136) may be used to indirectly measure the pressure within the cylinder 18. The output from the optical sensor 106, the voltage sensor 124, and/or the temperature sensor 136 may then be correlated (for example, as an input to an algorithm) by the controller 110 to determine the pressure in the cylinder 18. If the pressure is outside the predetermined pressure range, the indicator 112 may emit a signal (e.g., an audible, tactile, visual, or the like) to the user to alert that the user that the pressure of the cylinder 18 is outside the predetermined pressure range. In some embodiments, the controller 110 may keep a record of when the pressure of the cylinder 18 is outside the predetermined pressure range. In such an embodiment, the indicator 112 may be activated after the first time the pressure of the cylinder 18 is outside the predetermined pressure range. In other embodiments, the controller 110 may have a filter, delay, counting threshold, etc. that may delay the first showing of an alert.

In one embodiment, the pressure within the cylinder 18 may be determined by the current drawn by the motor 42 when activated. The current sensor 102 is operably connected to the motor 42 to determine the current draw of the motor 42. The output from the current sensor 102 may then be correlated by the controller 110 (for example, as an input to an algorithm) to determine if the pressure in the cylinder 18 is within the predetermined pressure range. For example, if the current draw of the motor 42 is above a predetermined high current value, the controller 110 will determine that the pressure in the cylinder 18 is above the predetermined pressure range, because the motor 42 requires additional current to return the piston 22 and the driver blade 26 toward the TDC position. In the opposite situation, if the current draw of the motor 42 is below a predetermined low current value, the controller 110 will determine that the pressure in the cylinder 18 is below the predetermined pressure range, because the motor 42 requires less current to return the piston 22 and the driver blade 26 toward the TDC position.

In another embodiment, the pressure within the cylinder 18 may be determined by the acceleration of the driver blade 26. The optical sensor 106 may be configured to detect each of the lift teeth 74 of the driver blade 26 as the driver blade 26 moves within the cylinder 18. In other words, the optical sensor 106 is configured to detect when one of the lift teeth 74 as it passes the optical sensor 106. The output from the optical sensor 106 may be correlated by the controller 110 (for example, as an input to an algorithm) to determine if the pressure in the cylinder 18 is within the predetermined pressure range. In the illustrated embodiment, the position of the driver blade 26 is detected as the driver blade 26 is moved from the BDC position to the TDC position and an acceleration value is correlated (for example, as an input to an algorithm stored in the controller 110) to a pressure value of the cylinder 18. The acceleration value of the driver blade 26 may, in actuality, have a negative value, representing deceleration of the driver blade as the driver blade 26 approaches the TDC position.

If the absolute value of the acceleration value of the driver blade 26 is less than a predetermined low acceleration value, the controller 110 will determine that the pressure in the cylinder 18 is above the predetermined high-pressure value. Alternatively, if the absolute value of the acceleration value of the driver blade 26 is greater than a predetermined high acceleration value, the controller 110 will determine that the pressure in the cylinder 18 is below the predetermined low-pressure value. When the controller 110 determines that either of these conditions occur, the controller 110 will activate the indicator 112 to alert the user that preventative maintenance is required to maintain the fastener driver 10 in proper working condition. In some embodiments, the controller 110 may use one or more of the sensors 101 (i.e., both the optical sensor 106 and the current sensor 102) to determine the pressure value of the cylinder 18.

In yet other embodiments, the voltage sensor 124 may detect the voltage of the electrical current provided to the motor 42, the speed or rotation sensor 128 may detect the speed or rotation of an output shaft of the motor 42 or lifter 66, and/or the temperature sensor 136 and/or other sensors within the fastener driver 10 (e.g., a Hall-effect sensor, a battery impedance sensor). These sensors may be configured to measure a characteristic of the fastener driver 10, which may then be correlated via the controller 110 to determine if the pressure in the cylinder 18 is within the predetermined pressure range. In some embodiments, the temperature sensor 136 may be a thermocouple or thermistor positioned proximate the cylinder 18 or near the bumper 98. In other embodiments, the temperature may be calculated based on an impedance of an electrical circuit with the driver 10. In other embodiments, the temperature sensor 136 may be directly coupled to the cylinder. In yet other embodiments, the pressure may be determined when a pump refills the pressure in the cylinder 18.

In some embodiments, the driver 10 may use multiple sensors (e.g., the current sensor 102, the optical sensor 106, the voltage sensor 124, and/or the temperature sensor 136) in unison to indirectly measure the pressure within the cylinder 18. For example, the driver 10 may use any combination of the current sensor 102, the optical sensor 106, the voltage sensor 124, and/or the temperature sensor 136 in unison to measure the pressure in the cylinder 18. In such an embodiment, the controller 110 may compare the pressure values determined from the different algorithms (e.g., described above) to ensure that detected pressure is correct.

In some embodiments, the driver 10 may predict one or more indicators associated with one or more needs for predictive maintenance. For instance, the driver 10 may use a machine learning algorithm in a binary classifier to determine if the pressure in the cylinder 18 is below the predetermined low threshold. In this way the indicator may not match an actual pressure, but the indicator will be associated with a need for predictive maintenance.

With reference to FIGS. 3 and 4, the bumper 98 absorbs some of the impact energy from the piston 22 during a normal drive cycle to stop the piston 22 in the BDC position. However, during a dry-fire cycle which may otherwise result in the absence of a fastener for the driver blade 26 to strike, the bumper 98 absorbs all the impact energy from the piston 22. As such, excessive dry-fire cycles may prematurely wear the bumper 98, and reduce the overall useful life of the fastener driver 10. In some embodiments, the wear on the bumper 98 may be determined by first monitoring or sensing a characteristic of the bumper 98. The characteristic may then be correlated (for example, as an input to an algorithm) by the controller 110 to determine a bumper wear value. The controller 110 may compare the bumper wear value to a predetermined bumper wear threshold range. The predetermined bumper wear threshold may be, for example, a value range that indicates when the bumper 98 is worn and should be soon replaced. If the bumper wear value is outside the bumper wear threshold range, the controller 110 may activate the indicator 112 to alert the operator that preventative maintenance is required to maintain the fastener driver 10 in proper working condition. In other words, if the bumper wear value exceeds a predetermined high bumper wear threshold or is less than a predetermined low bumper tooth wear threshold, the controller 110 may activate the indicator 112 to alert the operator that preventative maintenance is required.

In some embodiments, the controller 110 may be able to determine whether a dry-fire cycle occurs. In some embodiments, the contact sensor 140 may determine if the driver 10 is in contact with the workpiece. The contact sensor 140 may have a binary output, an analog output based on a retraction depth, or a pressure output. The output of the contact sensor 140 can be correlated to an operating condition of the driver 10 (e.g., standard operation, a dry-fire cycle, etc.). Since a dry-fire cycle imparts more impact energy to the bumper 98, the controller 110 may count the number of dry-fire cycles and assign a larger bumper wear value to the dry-fire cycles. In some embodiments, the impact energy imparted to the bumper 98 may be integrated over the bumper life to indicate a wear pattern on the bumper 98, which avoids inaccurate detection of the bumper's wear.

In some embodiments, the bumper wear value may be determined by the acceleration of the driver blade 26. As such, an optical sensor 106 is configured to detect each of the lift teeth 74 of the driver blade 26. The optical sensor 106 is configured to detect each of the lift teeth 74 as the driver blade 26 moves from the TDC position to the BDC position. The output from the optical sensor 106 may be correlated by the controller 110 (for example, as an input to an algorithm) to determine an impact force imparted on the bumper 98 by the piston 22. The impact force imparted on the bumper may be referred to as the bumper wear valuc. In some embodiments, the impact force imparted on the bumper 98 may be integrated over the bumper life to indicate a wear pattern on the bumper 98. The controller 110 is configured to compare the bumper wear value to the predetermined bumper wear threshold range and activates the indicator 112 when the bumper wear value outside the predetermined bumper wear threshold range to alert the operator that preventative maintenance is required to maintain the fastener driver 10 in proper working condition. In other words, if the bumper wear value exceeds a predetermined bumper wear threshold or is less than a predetermined low bumper wear threshold, the controller 110 may activate the indicator 112 to alert the operator that preventative maintenance is required.

In other embodiments, the bumper wear value may also be determined by an acceleration of the driver blade 26, but instead detected by the IMU 114. The IMU 114 may be disposed within the cylinder 18 (e.g., on the piston 22, the driver blade 26, or the bumper 98) and configured to measure the acceleration of the driver blade 26 as the driver blade 26 moves from the TDC position to the BDC position. The output acceleration from the IMU 114 may be used by the controller 110 (for example, as an input to an algorithm) to determine the impact force imparted on the bumper 98 by the piston 22 an determine a bumper wear valuc.

In yet another embodiment, there may be a change in an audible or vibration frequency of the driver blade 26 impacting the bumper 98 that correlates to the wear of the bumper 98. As such, an audio sensor 118 may be used to determine the bumper wear value. The audio sensor 118 may be disposed in the motor housing 38 and configured to detect the vibration frequency of the driver blade 26 in response to the piston 22 impacting the bumper 98. In some embodiments, the audio sensor 118 is disposed above the lifter 66. For example, the vibration frequency of the driver blade 26 in response to the piston 22 impacting the bumper 96 may be different when the bumper 96 is in a new condition compared to when the bumper 96 is in an old or worn condition. A microphone 120 may also be disposed within the motor housing 38 to detect the noise emanated from the driver blade 26 when it vibrates. An output from the audio sensor 118 may be used by the controller 110 (for example, as an input to an algorithm) to determine the wear on the bumper 98. In other embodiments, a user of the driver 10 may utilize an external device (e.g., a smart phone or the like) with a microphone to record the fastener driver 10. The audio may be processed to determine the bumper wear characteristic. In yet other embodiments, the audio may also be used to determine bumper wear, pressure of the cylinder, driver blade wear, or the like.

It should be appreciated that the controller 110 may use one or more the optical sensor 106, the IMU 114, and the audio sensor 118 to determine the bumper wear value. In other words, the controller 110 may combine the data from the different sensors 106, 114, 118 to more accurately calculate the bumper wear value.

Figure 5:
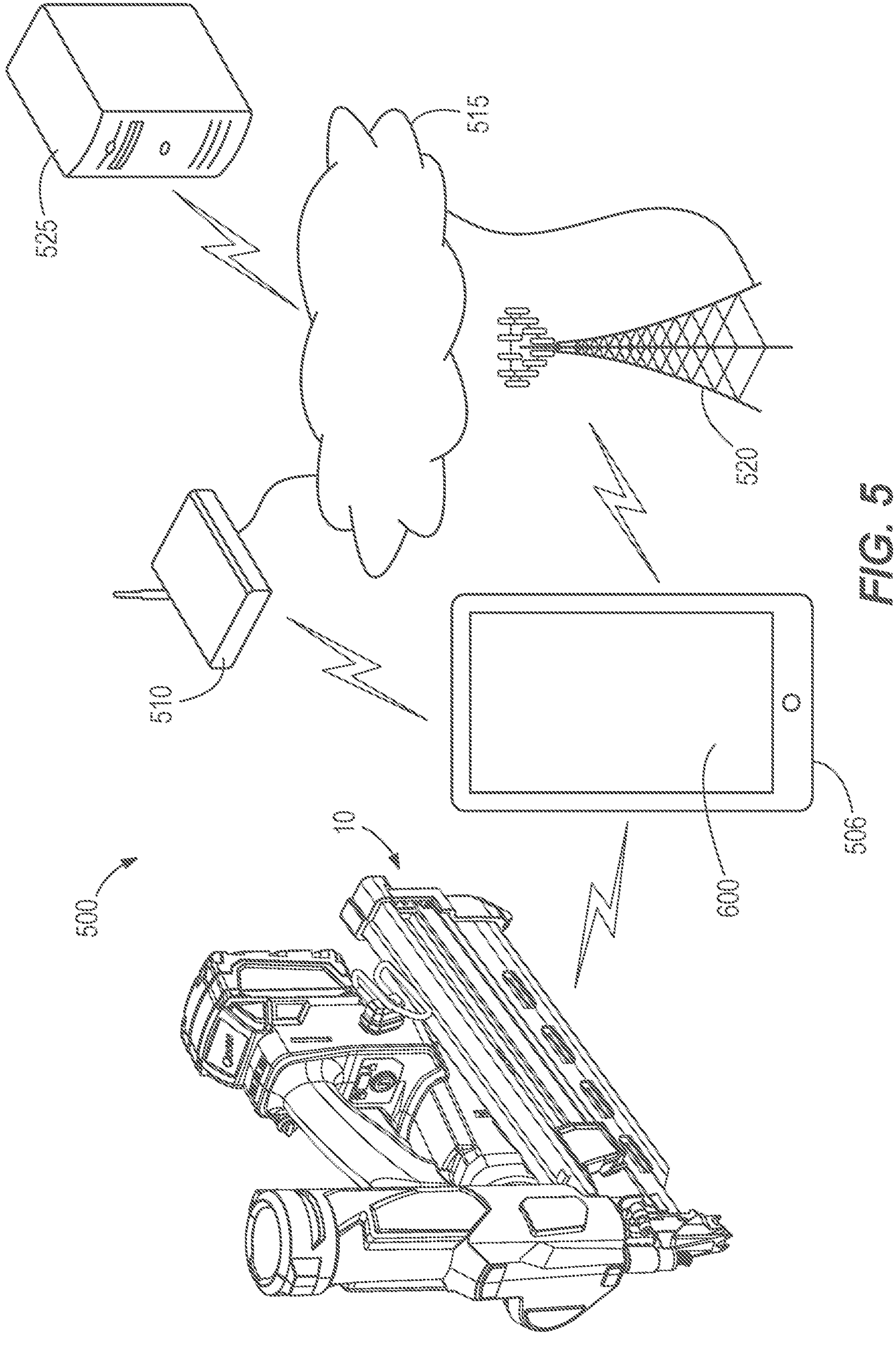
FIG. 5 illustrates a communication system for the power tool of FIG. 1 and an external device, according to some embodiments.

With reference to FIG. 5, the lift teeth 74 may experience wear from being in contact with the rollers 90. The wear on the lift teeth 74 may be determined by first monitoring or sensing a characteristic of the lift teeth 74. The characteristic may then be correlated via the controller 110 to determine a driver tooth wear value. The controller 110 may compare the driver tooth wear value to a predetermined driver tooth wear threshold range. If the driver tooth wear value is outside the driver tooth wear threshold range, the controller 110 may activate the indicator 112 to alert the operator that preventative maintenance is required to maintain the fastener driver 10 in proper working condition. In other words, if the drive tooth wear value exceeds a predetermined high driver tooth wear threshold or is less than a predetermined low driver tooth wear threshold, the controller 110 may activate the indicator 112 to alert the operator that preventative maintenance is required.

In some embodiments, the driver tooth wear value may be determined by the optical sensor 106. The optical sensor 106 may detect each of the lift teeth 74 as the driver blade 26 is moved from the TDC position to the BDC position. In other embodiments, the optical sensor 106 may detect each of the lift teeth 74 as the driver blade 26 is moved from the BDC position to the TDC position. As the driver blade 26 moves, a beam of light from the optical sensor 106 will be blocked when the lift teeth 74 intersect the beam. As such, the time that the beam is blocked can be used to calculate the width of the lift teeth 74. The time or the calculated width may be correlated by the controller 110 to determine the driver blade tooth wear value. The controller 110 may compare the sensed time to an expected time range. The expected time range may also be known as the predetermined driver blade tooth wear threshold range. If the driver tooth wear value is outside the driver tooth wear threshold range (i.e., when a tooth width is less than an expected value), the fastener driver 10 may activate the indicator 112 to alert the operator that preventative maintenance is required to maintain the fastener driver 10 in proper working condition.

In other embodiments, the driver tooth wear value may be determined by the audio sensor 118. The audio sensor 118 may be disposed in the motor housing 38 and configured to detect the vibration frequency of the driver blade 26 moving from the BDC position to the TDC position. In some embodiments, the audio sensor 118 is disposed above the lifter 66. For example, the vibration frequency of the driver blade 26 being lifted by the lifter 66 may be different when the lift teeth 74 are in a new condition compared to when the lift teeth 74 are in an old or worn condition. A microphone 120 may also be disposed within the motor housing 38 to detect the noise emanated from the driver blade 26. An output from the audio sensor 118 may be used by the controller 110 (for example, as an input to an algorithm) to determine the wear on the lift teeth 74. In these embodiments, the vibration frequency sensed may be correlated by the controller 110 to calculate the driver blade tooth wear value. The driver blade tooth wear value may be compared to an expected vibration frequency range, which may be referred to as the predetermined driver blade tooth wear threshold range. If the driver tooth wear value is outside the driver tooth wear threshold range, the fastener driver 10 may activate the indicator 112 to alert the operator that preventative maintenance is required to maintain the fastener driver 10 in proper working condition.

In yet other embodiments, the driver tooth wear value may be determined by the IMU 114. The IMU 114 may be disposed within the cylinder 18 and configured to measure the acceleration of the driver blade 26 as the driver blade 26 moves from the BDC position to the TDC position. The output acceleration from the IMU 114 may be used by the controller 110 via (for example, as an input to an algorithm) to determine the wear on the lift teeth 74. For example, if the lift teeth 74 are in a new, unworn state, it is expected that the acceleration of the driver blade 26 may be different than when the lift teeth 74 are in a worn state. The acceleration of the driver blade 26 may be correlated by the controller 110 to determine the driver blade tooth wear value. The driver blade tooth wear value may be compared to an expected acceleration range, which may be referred to as the predetermined driver blade tooth wear threshold range. If the driver tooth wear value is outside the driver tooth wear threshold range, the fastener driver 10 may activate the indicator 112 to alert the operator that preventative maintenance is required to maintain the fastener driver 10 in proper working condition.

It should be appreciated that the controller 110 may use one or more the optical sensor 106, the IMU 114, and the audio sensor 118 to determine driver tooth wear value. In other words, the controller 110 may combine the output from the different sensors 106, 114, 118 to more accurately calculate the drive tooth wear value. In addition, during operation of the fastener driver 10, the controller 110 may include multiple types of algorithms (e.g., linear, multiple, partial) to calculate the characteristic of the fastener driver 10.

FIG. 5 illustrates a communication system 500. The communication system 500 includes at least one power tool device (e.g., illustrated as the nailer 10) and an external device 506. The nailer 10 and the external device 506 can communicate wirelessly while they are within a communication range of each other. The nailer 10 may communicate a status, operation statistics, sensor data, stored usage information, and the like associated with the nailer 10. Although the nailer 10 is illustrated, any other type of power tool can be provided with the same or similar communications capabilities.

More specifically, the nailer 10 can monitor, log, and/or communicate various operational parameters. The external device 506 can also transmit data to the nailer 10 for operational configuration, firmware updates, or to send commands. The external device 506 also allows a user to set operational parameters, safety parameters, select tool modes, and the like for the nailer 10.

The external device 506 is, for example, a smart phone (as illustrated), a laptop computer, a tablet computer, a personal digital assistant ("PDA"), or another electronic device capable of communicating wirelessly with the nailer 10 and providing the user interface 600 (see, e.g., FIG. 5). The external device 506 provides the user interface 600 and allows a user to access and interact with the nailer 10. The external device 506 can receive user inputs to determine operational parameters, enable or disable features, and the like. The user interface 600 of the external device 506 provides an easy-to-use interface for the user to control and customize operation of the nailer 10 or a different type of power tool.

In addition, as shown in FIG. 5, the external device 506 can also share the operational data obtained from the nailer 10 with a remote server 525 connected through a network 515. The remote server 525 may be used to store the operational data obtained from the external device 506, provide additional functionality and services to the user, or a combination thereof. In some embodiments, storing the information on the remote server 525 allows a user to access the information from different locations. In some embodiments, the remote server 525 collects information from various users regarding their power tool devices and provide statistics or statistical measures to the user based on information obtained from the different power tools. The network 515 may include various networking elements (routers 510, hubs, switches, cellular towers 520, wired connections, wireless connections, etc.) for connecting to, for example, the Internet, a cellular data network, a local network, or a combination thereof. In some embodiments, the nailer 10 is configured to communicate directly with the remote server 525 through an additional wireless interface or with the same wireless interface that the nailer 10 uses to communicate with the external device 506.

Various features of the disclosure are set forth in the following claims.

What is claimed is:

1. A powered fastener driver comprising:
- a housing;
- a cylinder within the housing, the cylinder containing a pressurized gas;
- a piston within the cylinder and moveable from a top-dead-center position to a bottom-dead-center position;
- a driver blade moveably coupled to the piston for driving a fastener into a workpiece;
- a lifter mechanism for providing torque to move the driver blade from the bottom-dead-center position toward the top-dead-center position, the lifter mechanism including a motor;
- a sensor configured to monitor a current draw of the motor; and
- a controller electrically connected to the motor and the sensor, the controller configured to:
  - monitor the current draw of the motor,
  - correlate, using an algorithm stored in the controller, the current draw to a pressure value,
  - compare the pressure value to a predetermined pressure range, and
  - activate an indicator when the pressure value is outside the predetermined pressure range.

2. The powered fastener driver of claim 1, wherein the indicator is activated when the pressure value is greater than the predetermined pressure range.

3. The powered fastener driver of claim 2, wherein the predetermined pressure range is between 105 PSI and 115 PSI.

4. The powered fastener driver of claim 1, wherein when the controller determines that the current draw of the motor is above a predetermined high current value, the controller determines that the pressure in the cylinder is above the predetermined pressure range.

5. The powered fastener driver of claim 4, wherein when the controller determines that the current draw of the motor is below a predetermined low current value, the controller determines that the pressure in the cylinder is below the predetermined pressure range.

6. The powered fastener driver of claim 1, wherein the predetermined pressure range is defined by a predetermined low-pressure value and a predetermined high-pressure value.

7. The powered fastener driver of claim 6, further comprising a temperature sensor configured to detect a temperature of the cylinder, and wherein the predetermined low-pressure value is based on the temperature of the cylinder.

8. A powered fastener driver comprising:
- a housing;
- a cylinder within the housing, the cylinder containing a pressurized gas;
- a piston within the cylinder and moveable from a top-dead-center position to a bottom-dead-center position;
- a driver blade moveably coupled to the piston for driving a fastener into a workpiece;
- a lifter mechanism for providing torque to move the driver blade from the bottom-dead-center position toward the top-dead-center position, the lifter mechanism including a motor;
- an optical sensor configured to monitor a position of the driver blade; and a controller electrically connected to the motor and the optical sensor, the controller configured to:

monitor the position of the driver blade, correlate, using an algorithm stored in the controller, the position of the driver blade to an acceleration value of the driver blade, correlate, using an algorithm stored in the controller, the acceleration value of the driver blade to a pressure value of the cylinder, compare the pressure value to a predetermined pressure range, and activate an indicator when the pressure value is outside the predetermined pressure range.

9. The powered fastener driver of claim 8, wherein the position of the driver blade is monitored as the driver blade moves from the bottom-dead-center position toward the top-dead-center position.

10. The powered fastener driver of claim 9, wherein the acceleration value of the driver blade is calculated as the driver blade moves from the bottom-dead-center position toward the top-dead-center position, a predetermined acceleration range includes a predetermined low deceleration value and a predetermined high deceleration value, the indicator is activated when an absolute value of the acceleration value is less than the predetermined low deceleration value to indicate a pressure of the cylinder is above a predetermined high pressure value, and the indicator is activated when the absolute value of the acceleration value is greater than the predetermined high deceleration value to indicate the pressure of the cylinder is below a predetermined low pressure value.

11. The powered fastener driver of claim 10, further comprising a temperature sensor configured to detect a temperature of the cylinder, and wherein the predetermined low pressure value is based on the temperature of the cylinder.

12. The powered fastener driver of claim 8, wherein the driver blade includes a plurality of lift teeth, and wherein the optical sensor is configured to detect each of the lift teeth as the driver blade moves from the top-dead-center position to the bottom-dead-center position to determine the position of the driver blade.

13. The powered fastener driver of claim 8, wherein the predetermined pressure range is between 105 PSI and 115 PSI.

14. A powered fastener driver comprising:

a housing;

a cylinder within the housing, the cylinder containing a pressurized gas;

a piston within the cylinder and moveable from a top-dead-center position to a bottom-dead-center position;

a driver blade moveably coupled to the piston for driving a fastener into a workpiece;

a lifter mechanism for providing torque to move the driver blade from the bottom-dead-center position toward the top-dead-center position, the lifter mechanism including a motor;

a current sensor configured to monitor a current draw of the motor;

an optical sensor configured to monitor a position of the driver blade; and a controller electrically connected to the motor, the current sensor, and the optical sensor, the controller configured to:

monitor the current draw of the motor using the current sensor and the position of the driver blade using the optical sensor, correlate, using a first algorithm stored in the controller, the current draw to a first pressure value, correlate, using a second algorithm stored in the controller, the position of the driver blade to an acceleration value of the driver blade and the acceleration value to a second pressure value of the cylinder, compare the first pressure value and the second pressure value to a predetermined pressure range, and activate an indicator when the first pressure value or the second pressure value is outside the predetermined pressure range.

15. The powered fastener driver of claim 14, wherein when the controller determines that the current draw of the motor is above a predetermined high current value, the controller determines that the pressure in the cylinder is above the predetermined pressure range.

16. The powered fastener driver of claim 14, wherein when the controller determines that the current draw of the motor is below a predetermined low current value, the controller determines that the pressure in the cylinder is below the predetermined pressure range.

17. The powered fastener driver of claim 14, wherein the acceleration value of the driver blade is calculated as the driver blade moves from a bottom-dead-center position toward a top-dead-center position, a predetermined acceleration range includes a predetermined low deceleration value and a predetermined high deceleration value, the indicator is activated when an absolute value of the acceleration value is less than the predetermined low deceleration value to indicate a pressure of the cylinder is above a predetermined high pressure value, and the indicator is activated when the absolute value of the acceleration value is greater than the predetermined high deceleration value to indicate the pressure of the cylinder is below a predetermined low pressure value.

18. The powered fastener driver of claim 14, further comprising a temperature sensor configured to detect a temperature of the cylinder, and wherein the predetermined pressure range is based on the temperature of the cylinder.

19. The powered fastener driver of claim 14, wherein the driver blade includes a plurality of lift teeth, and wherein the optical sensor is configured to detect each of the lift teeth as the driver blade moves from the top-dead-center position to the bottom-dead-center position to determine the position of the driver blade.

20. The powered fastener driver of claim 14, wherein the predetermined pressure range is between 105 PSI and 115 PSI.

* * * * *